United States Patent [19]
Nishida et al.

[11] Patent Number: 5,950,581
[45] Date of Patent: Sep. 14, 1999

[54] TWO-CYCLE INTERNAL COMBUSTION ENGINE

[75] Inventors: Kenji Nishida; Masahiro Asai; Masashi Amano, all of Wako, Japan

[73] Assignee: Honda Giken Kogyo Kabushiki Kaisha, Tokyo, Japan

[21] Appl. No.: 09/083,504

[22] Filed: May 22, 1998

[30] Foreign Application Priority Data

May 24, 1997 [JP] Japan .................................. 9-150376

[51] Int. Cl.⁶ ..................................................... F02B 33/04
[52] U.S. Cl. .................. 123/73 C; 123/65 V; 123/65 PD
[58] Field of Search .............................. 123/73 C, 73 CB, 123/65 V, 65 PD, 73 B

[56] References Cited

U.S. PATENT DOCUMENTS 5,315,962   5/1994   Renault et al. ........................ 123/65 V

FOREIGN PATENT DOCUMENTS

A3-100318   4/1991   Japan .
A5-302521   11/1993  Japan .

*Primary Examiner*—Noah P. Kamen
*Attorney, Agent, or Firm*—Birch, Stewart, Kolasch & Birch, LLP.

[57] ABSTRACT

A two-cycle internal combustion engine includes a control valve disposed within a communicating passage between the combustion chamber and a chamber portion adjacent to the combustion chamber. The control valve is for controlling the opening and closing of the communicating passage. Blowby of an air-fuel mixture supplied to the combustion chamber can be prevented to reduce fuel consumption and increase the exhaust gas purifying performance. A communicating passage portion between the control valve and the fuel supply opening is configured to spray fuel from the control valve to a part or all of a wall surface of the communicating passage portion and the wall surface of the communicating passage portion is shaped to guide the fuel into the combustion chamber.

18 Claims, 6 Drawing Sheets

TWO-CYCLE INTERNAL COMBUSTION ENGINE

BACKGROUND OF THE INVENTION

1. Field of the Invention

The present invention relates to a two-cycle internal combustion engine capable of directing injection of an air-fuel mixture into a combustion chamber while preventing blowby of the air-fuel mixture. This injection of the air-fuel mixture in the present invention reduces fuel consumption and improves exhaust gas purifying performance.

2. Description of Background Art

In a related art two-cycle internal combustion engine, fuel supplied from a carburetor or the like is mixed with intake air, and the air-fuel mixture is sucked in crank chamber and supplied to the combustion chamber through scavenging openings. In this related art engine, since the timing of the opening of the exhaust opening is set earlier than the timing of the opening the scavenging openings (an upper edge of the exhaust opening is higher than upper edges of the scavenging openings), exhaust of the air-fuel mixture supplied in the combustion engine into the exhaust opening, i.e., "blowby" can occur.

The blowby phenomenon is suppressed by an exhaust pulsation effect; however, it is difficult to suppress the blowby over the entire operational range. As a result, the blowby increases fuel consumption and decreases exhaust gas purifying performance.

Two-cycle internal combustion engines intended to solve the above-mentioned problem have been disclosed in Japanese Patent Laid-open Nos. Hei 3-100318 and Hei 5-302521. In the two-cycle internal combustion engine described in Japanese Patent Laid-open No. Hei 3-100318, a high pressure chamber is connected to a crank chamber through a check valve. The high pressure chamber is connected to a combustion chamber through an air passage and a solenoid valve is interposed at a lower end of the air passage. Furthermore, a fuel injection valve for injecting fuel in the combustion chamber is provided at an upper end of the air passage. In the two-cycle internal combustion engine described in Japanese Patent Laid-open No. Hei 5-302521, a chamber portion is disposed adjacent to the crank case and the cylinder block, an intake control valve is interposed between the crank chamber and the chamber portion, a scavenging control valve is interposed between the chamber portion and the combustion chamber in the cylinder; and a fuel injection valve for injecting fuel in the chamber portion is provided.

The two-cycle internal combustion engine described in Japanese Patent Laid-open No. Hei 3-100318 has a problem, however. Since the fuel supply opening is provided in a side wall of the cylinder at a position facing the combustion chamber and the fuel injection valve is disposed directly perpendicular to the fuel supply opening, sprayed fuel collides with the cylinder wall on the exhaust opening side which is opposed to the fuel supply opening. Therefore, the sprayed fuel can adhere to the cylinder wall.

If the fuel spraying timing is set to be earlier in order to prevent interference between the piston and the sprayed fuel, the sprayed fuel tends to be blown-by through the exhaust opening. If the fuel supply opening is disposed at a higher position to delay the fuel spraying timing, the fuel injection valve is directly exposed to the combustion gas at a high temperature, the injection valve to require a high thermal resistance.

Furthermore, in the two-cycle internal combustion engine described in Japanese Patent Laid-open No. Hei 5-302521, since an air-fuel mixture injected from the scavenging control valve is supplied into the combustion chamber through all of the scavenging openings, the blowby of the air-fuel mixture from the exhaust opening cannot be avoided.

In the two-cycle internal combustion engine in which fuel is directly injected into the cylinder, the direction of the sprayed fuel is generally very important, since if the direction degrades, short-cut of sprayed fuel through the exhaust opening occurs and/or interference with the cylinder wall, combustion chamber wall, piston and the like during diffusion of the sprayed fuel.

If the above-mentioned interference occurs during a stage where atomization and diffusion of sprayed fuel are insufficient, fuel tends to adhere on the walls. As a result, it is difficult to convert the fuel into an air-fuel mixture. This obstructs combustion and degrades the engine efficiency. The related art engine has failed to solve the problems that improper direction of sprayed fuel into the combustion chamber causes.

In particular, for a rotary valve type fuel injection control valve in which a valve opening is extended in the peripheral direction, it is difficult to inject fuel in the controlled direction during fuel injection.

SUMMARY AND OBJECTS OF THE INVENTION

The present invention relates to an improved two-cycle internal combustion engine intended to solve the above-described problems. According to a first aspect of the present invention, a two-cycle internal combustion engine includes a control valve disposed in a communicating passage. The communicating passage communicates a combustion chamber to a chamber portion adjacent to the combustion chamber. The valve controls the opening and closing of the communicating passage and a fuel or an air-fuel mixture is supplied to the combustion chamber through the communicating passage. Furthermore, a portion of the communicating passage between the control valve and a fuel or air-fuel mixture supply opening facing the combustion chamber is configured such that sprayed fuel is injected from the control valve to part or all of a wall surface of the communicating passage portion. The wall surface of the communicating passage portion is directed toward the combustion chamber side as viewed from the control valve to the fuel supply opening in order to serve as a guide for controlling the spray direction of the fuel.

According to the first embodiment of the present invention, the communicating passage portion between the control valve and the fuel supply opening includes a guide for controlling the spray direction of the fuel. Accordingly, during injection of a rich air-fuel mixture, the direction of sprayed fuel is optimally controlled by the guide. As a result, it is possible to prevent the occurrence of short-cut (blowby) of the sprayed fuel through the exhaust opening and/or interference with the cylinder wall surface, combustion chamber wall, piston and the like. Therefore, reduced fuel consumption and a high exhaust gas purifying performance is achieved.

According to a second aspect of the present invention, the two-cycle internal combustion engine includes an upper space above the fuel injection port which is extended to reduce the negative pressure in the space caused by the fuel injection. As a result, even when the communicating passage portion is relatively short, the negative pressure in the upper space can be close to the negative pressure in a lower space below the fuel injection port. Therefore, it is possible to keep the direction of the injected and sprayed fuel proper, and therefore prevent interference of the fuel with the cylinder wall, combustion chamber wall, piston and the like.

According to a third aspect of the present invention, when the space above the fuel injection port is sufficiently large, a negative pressure in the upper space caused by fuel injection can be sufficiently reduced. Therefore, even when the communicating passage portion is relatively short, the negative pressure in the upper space above the fuel injection port can be close to the negative pressure in a lower space below the fuel injection port, it is possible to keep the direction of the injected and sprayed fuel proper. Therefore, interference of the sprayed fuel with the cylinder wall, combustion chamber wall, piston and the like is avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Herinafter, a first embodiment of the present invention will be described with reference to FIGS. 1–3.

Figure 1:
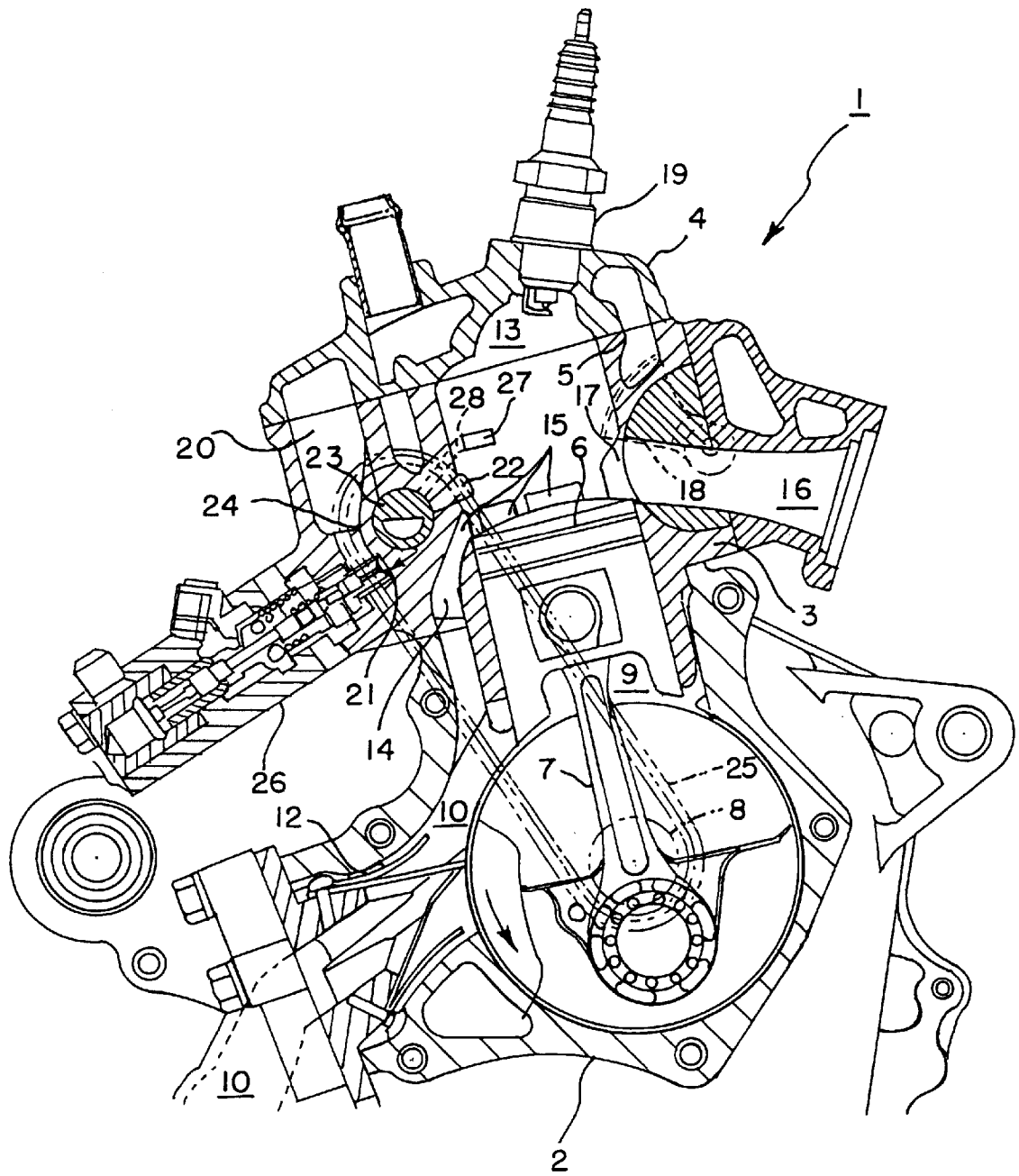
FIG. 1 is a schematic vertical sectional view of a two-cycle internal combustion engine according to a first embodiment of the present invention.
Figure 2:
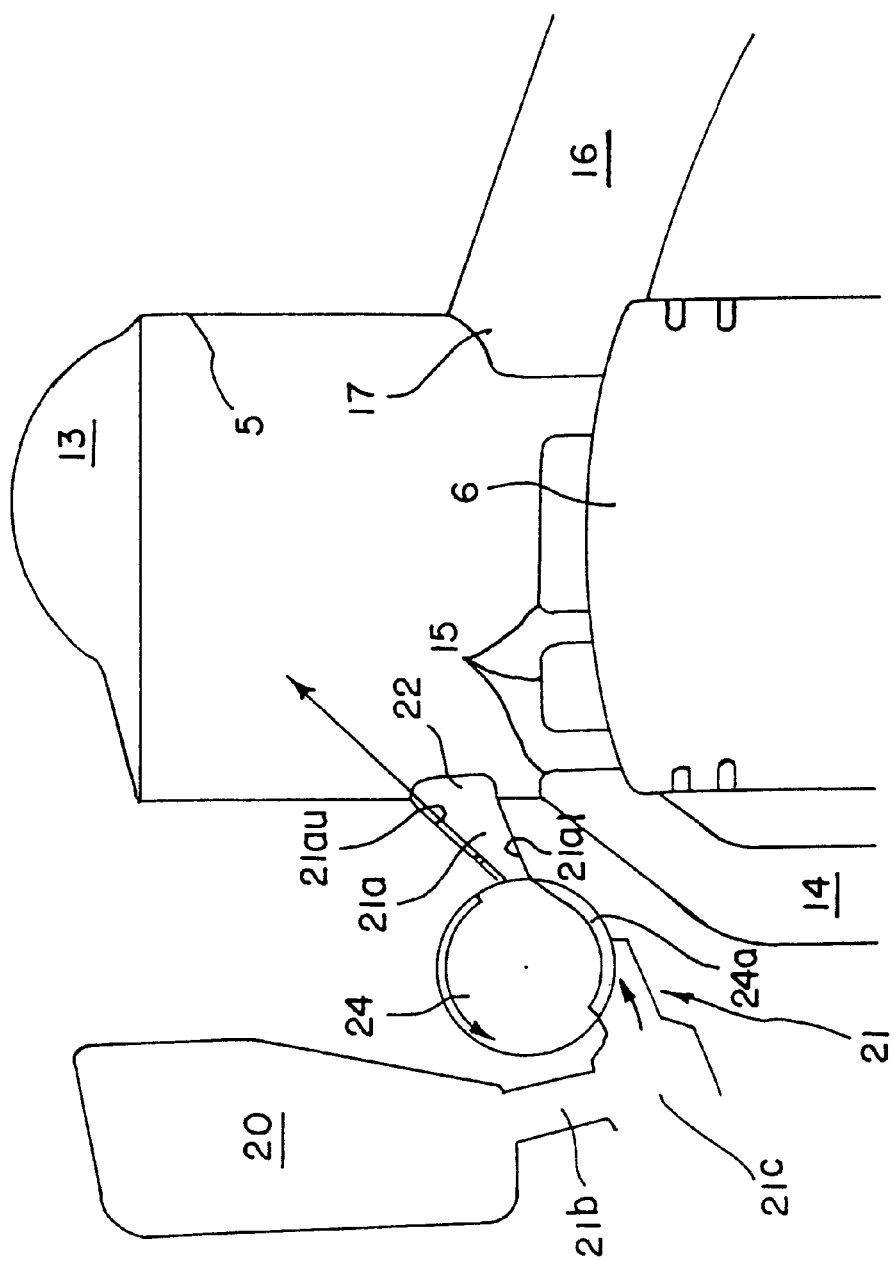
FIG. 2 is a schematic enlarged view of an essential portion shown in FIG. 1.
Figure 3:
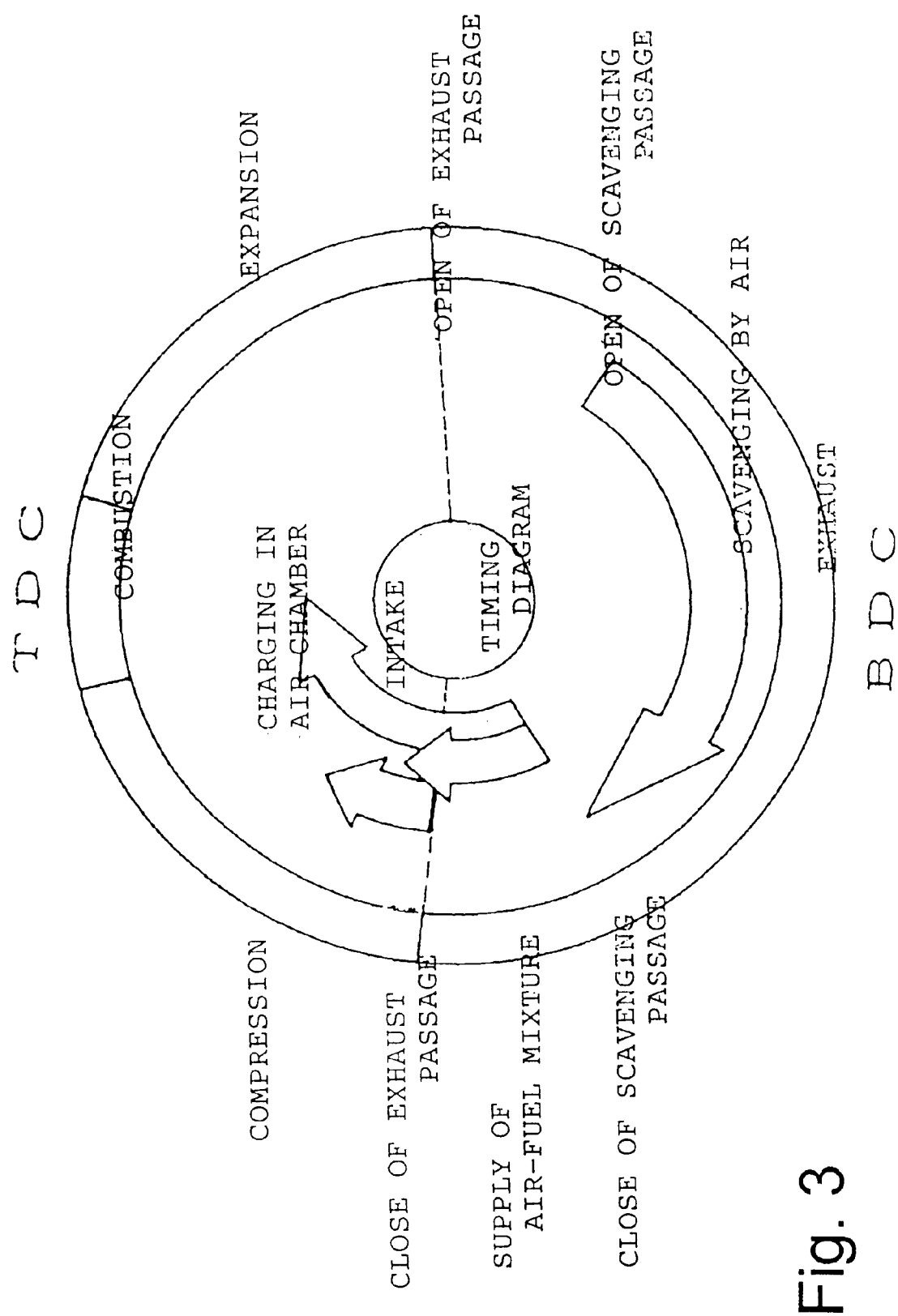
FIG. 3 is a diagram illustrating an operational cycle of the two-cycle internal combustion engine in the embodiment shown in FIG. 1.

In FIGS. 1–3, a spark ignition type two-cycle internal combustion engine 1 is mounted on a motorcycle (not shown). A cylinder block 3 and a cylinder head 4 are sequentially superimposed on the crank case 2 and integrated to each other. A piston 6 is vertically slidably inserted in a cylinder bore 5 formed in the cylinder block 3. The piston 6 is connected to a crank shaft 8 by means of a connecting rod 7, so that the crank shaft 8 is rotated by vertical movement of the piston 6. An intake passage 10 extending forward from a rear side of a vehicular body is connected to an intake passage 10 in the crank case 2. A throttle valve (not shown) and a reed valve 12 are interposed in series in the intake passage 10. The throttle valve is connected to a throttle grip (not shown) through a connecting means (not shown) such that an opening degree of the throttle valve is increased when the throttle grip is twisted in one direction.

Air supply scavenging passages 14 are formed in the crank case 2 and the cylinder block 3. Five air supply passages are provided, (two on each of the right and left sides) for communicating an upper portion of the cylinder bore 5 to the crank case 9 and a rear side air supply scavenging passage (which will be described later) opened under both an air-fuel mixture supply opening (fuel supply opening) 22 and a highly compressed gas intake opening 27. Ends of these scavenging passages on the cylinder bore 5 side form openings 15 opened to the cylinder bore 5. The air supply scavenging passage 14 is directly connected to the intake passage 10 in the crank case 2 on the downstream side of the reed valve 12.

An exhaust opening 17 of an exhaust passage 16 on the cylinder bore 5 side extends higher than the openings 15 of these air supply scavenging passages 14. The exhaust opening 17 is disposed at a position opposed to the rich air-fuel mixture supply opening (fuel supply opening) 22 (which will be described later). Reference numeral 18 indicates an exhaust control valve, provided near the exhaust opening 17 for changing the height of an upper edge of the exhaust opening 17 so as to vary the exhaust timing. The exhaust control valve 18 is also for changing the cross-section of the exhaust passage 16.

A combustion chamber 13 formed in an approximately semi-spherical shape is disposed over the cylinder bore 5. The combustion chamber is offset toward the exhaust opening 17. An ignition plug 19 is disposed in the combustion chamber 13. Furthermore, a chamber portion 20 is juxtaposed to the cylinder block 3 to a side of the combustion chamber 13 such that it is offset toward the rear side of the body. A valve containing a hole 23 is disposed halfway between the chamber portion 20 and the combustion chamber 13. A rich air-fuel mixture injection control valve 24 composed of a rotary valve is rotatably inserted in the valve containing hole 23. The rich air-fuel mixture injection control valve 24 is rotated at the same rotational speed as that of the crank shaft 8 in a direction reversed to the rotational direction of the crank shaft 8 (clockwise in FIG. 1) by a transmission mechanism 25.

An injection port of a fuel injection device 26 is disposed to face to a portion 21b of the communicating passage 21 located on the upstream side of the rotary valve 24. A highly compressed gas for forming a rich air-fuel mixture is supplied into the chamber portion 20 from the highly compressed gas intake opening 27 formed in a cylinder side wall at a position facing the combustion chamber 13. The highly compressed gas is supplied into the chamber portion 20 through the communicating passage 28 for communicating the chamber portion 20 to the highly compressed gas intake opening 27 while being controlled by a rotary valve axially integrated with the rich air-fuel mixture injection control valve 24.

The highly compressed gas supplied into the chamber portion 20 flows through the communicating passage portion 21b. The highly compressed gas is mixed in a mixing chamber 21c, formed in the communicating passage portion 21b, with fuel injected from the fuel injection device 26 to form a rich air-fuel mixture. When the rich air-fuel mixture injection control valve 24 is opened, the rich air-fuel mixture thus formed is press-fed by high pressure in the chamber portion 20, and is injected from the rich air-fuel supply opening 22 into the combustion chamber 13 through a communicating passage portion 21a on the downstream side from the rich air-fuel mixture injection control valve 24.

The positional relationship of the communicating passage portion 21a on the downstream side from the rich air-fuel mixture control valve 24 to the rich air-fuel mixture injecting control valve 24 and the rich air-fuel supply opening 22 is set such that an upper wall surface 21au of the communicating passage portion 21a serves as a guide for allowing sprayed fuel injected from the rich air-fuel mixture injection control valve 24 to be directed toward the combustion chamber 13. More specifically, the upper wall surface 21au of the communicating passage portion 21a, which serves as the guide, is shaped to be directed on the combustion chamber 13 side as seen in the direction from the rich air-fuel mixture injection control valve 24 to the rich air-fuel mixture supply opening 22.

The rich air-fuel mixture flows as follows: When a leading end of a peripheral cutout 24a of the rich air-fuel mixture injection control valve 24 passes over a lower wall surface 21al of the communicating passage portion 21a, while the control valve 24 is rotating counterclockwise, the rich air-fuel mixture in the mixing chamber 21c is injected in the communicating passage portion 21a. Since the direction along which the rich air-fuel mixture is injected substantially corresponds to the rotational direction of the rich air-fuel mixture injection control valve 24, the rich air-fuel collides with the deepest portion of the upper wall surface 21au on the side opposed to the rotational direction of the rich air-fuel mixture injection control valve 24. The direction of the rich air-fuel mixture changes its course and and advances toward the rich air-fuel mixture supply opening 22 while being guided by the upper wall surface 21au. Finally, the rich air-fuel mixture from the opening 22 is diffused and sprayed toward the combustion chamber 13 while being kept in its guided course.

The spark ignition type two-cycle internal combustion engine 1, shown in the figures, having the above configuration operates as follows: When the crank shaft 8 is rotated counterclockwise in FIG. 1 by a starter motor (not shown), the exhaust opening 17 is blocked by the piston 6 at 90° before top dead center (TDC) position (compression stroke) as shown in FIG. 3. As the rich air-fuel mixture injection control valve 24 opens, the highly compressed gas in the combustion chamber 13 flows into the chamber portion 20 through the highly compressed gas intake opening 27 and the communication passage 28.

At about the 75° before top dead center (TDC) position, the rich air-fuel mixture supply opening 22 at the end portion of the communication passage 21 on the combustion chamber 13 side is blocked by the piston 6. Furthermore, the highly compressed gas intake opening 27 is blocked by the piston 6, so that the supply of the rich air-fuel mixture into the combustion chamber 13 and the charging of the highly compressed gas into the chamber portion 20 are sequentially completed.

The interior of the combustion chamber 13 is further compressed until a position just before the top dead center position where the ignition plug 19 is ignited. Furthermore, the crank chamber 9 is continuously expanded by upward movement of the piston 6, to thus continue the intake operation.

After the piston 6 reaches the top dead center (TDC) position, the air-fuel mixture in the combustion chamber 13 is burned and the interior of the combustion chamber 13 is expanded. The crank chamber 9 is then compressed by downward movement of the piston 6 to compress air in the crank chamber 9.

At the 90° after top dead center (TDC) position (which varies depending on the vertical position of the exhaust control valve 18), the exhaust opening 17 is opened to exhaust a combustion gas from the exhaust passage 16.

Furthermore, at about the 122° after top dead center (TDC) position, the scavenging openings 15 are opened by downward movement of the piston 6. As a result, the air (not containing fuel) compressed in the crank chamber 9 flows from the scavenging openings 15 into the combustion chamber 13 through the air supply scavenging passages 14 to push the burned gas in the combustion chamber 13 toward the exhaust opening 17. Therefore, scavenging with air only occurs. At the same time, fuel is injected from the fuel injection device 26 into the mixing chamber 21c to create a rich air-fuel mixture.

At about the 58° after bottom dead center (BDC) position, the scavenging openings 15 are blocked by upward movement of the piston 6. The scavenging due to flow-in of the air from the scavenging openings 15 is stopped. From this position, the rich airfuel mixture injection control valve 24 opens the communicating passage 21 and the air-fuel mixture in the mixing chamber 21c passes through the communication passage portion 21b, the rich air-fuel mixture injection control valve 24 and the communication passage portion 21a. The air-fuel mixture is then injected from the rich air-fuel supply opening 22 into the combustion chamber 13. At the same time, air is sucked in the crank chamber 9 from the intake passage 10 through the reed valve 12 by expansion of the interior of the crank chamber 9 by upward movement of the piston 6. In addition, upon injection of the rich air-fuel mixture, little blowby of the air-fuel mixture occurs.

In the spark ignition type two-cycle internal combustion engine 1 according to the present invention, since scavenging with only air occurs at the beginning of the scavenging step, it is possible to prevent blowby of the air-fuel mixture through the interior of the combustion chamber 13 out the exhaust passage 16. Therefore, fuel consumption is reduced and air pollution due to an unburned gas is prevented.

The air-fuel mixture produced by mixing air charged in the chamber portion 20 with fuel injected from the fuel injection device 26 in the mixing chamber 21c is rich and the rich air-fuel mixture flows in the combustion chamber 13 which has been sufficiently scavenged by air (not containing fuel) which has passed through the air supply scavenging passages 14. Therefore, the rich air-fuel mixture becomes an air-fuel mixture at a suitable concentration in the combustion chamber 13. The air-fuel mixture adjusted in the combustion chamber 13 allows desired combustion, thus attaining a low level of fuel consumption and a high exhaust gas purifying performance.

The positional relationship of the communicating passage portion 21a on the downstream side of the rich air-fuel mixture injection control valve 24 to the rich air-fuel mixture injection control valve 24 and the rich air-fuel mixture supply opening 22 is set such that the upper wall surface 21*au* serves as a guide for allowing sprayed fuel injected from the rich air-fuel mixture injection control valve 24 to be directed toward the combustion chamber 13. The upper wall surface 21*au* of the communicating passage portion 21*a*, which serves as the guide, is shaped to direct the sprayed fuel toward the combustion chamber 13 side as seen in the direction from the rich air-fuel mixture injection control valve 24 to the rich air-fuel mixture supply opening 22. As a result, during injection of the rich air-fuel mixture, the direction of sprayed fuel is usually optimally controlled by the guide so that it is possible to prevent the occurrence of short-cut (blowby) of sprayed fuel from the exhaust opening 17. Furthermore, interference with the cylinder wall surface, combustion chamber wall, piston 6 and the like is also avoided. Therefore, a low level of fuel consumption and a high exhaust gas purifying performance is achieved.

Figure 4:
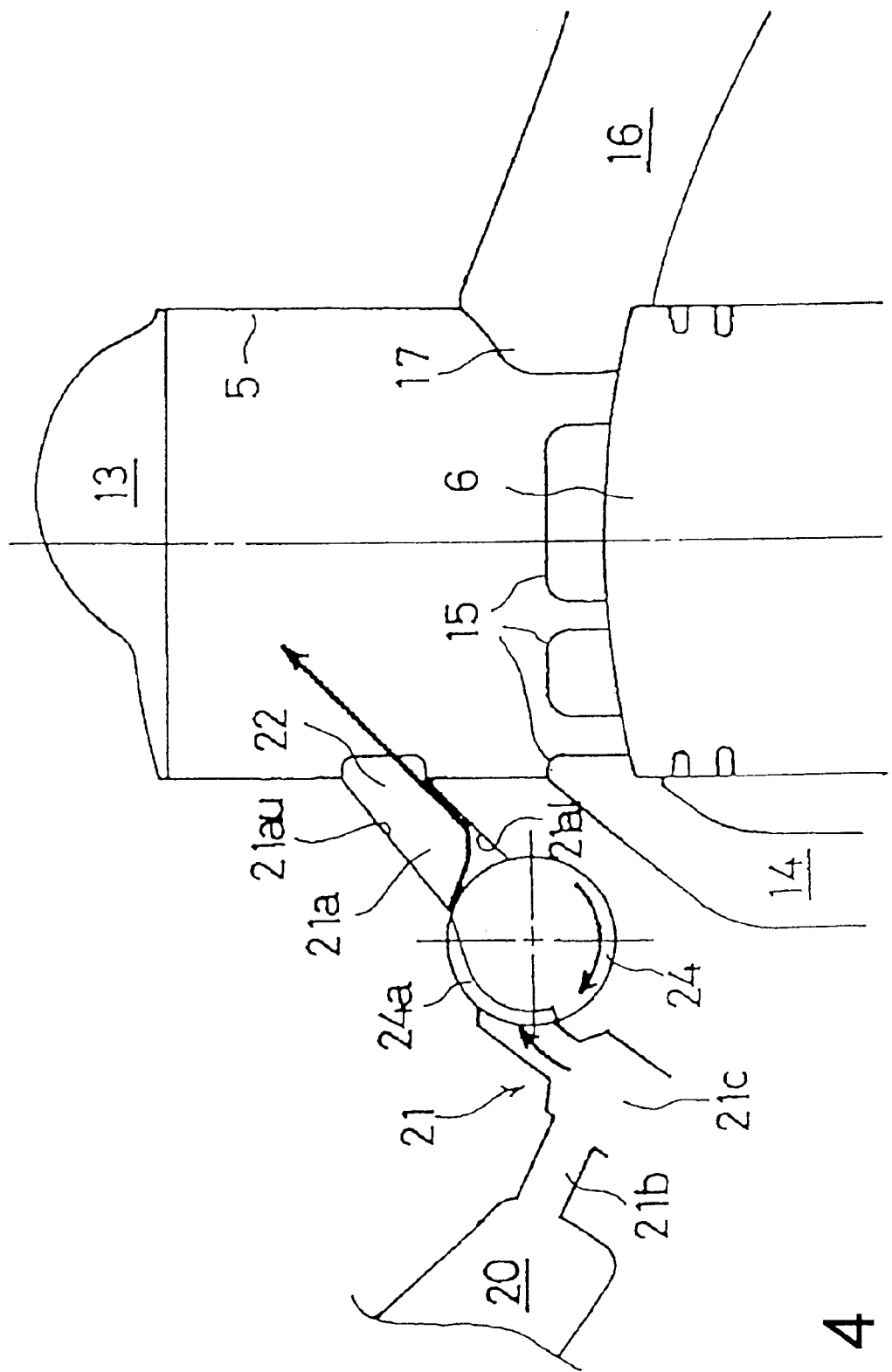
FIG. 4 is a schematic enlarged view, similar to FIG. 2, showing an essential portion of a two-cycle internal combustion engine according to a second embodiment of the present invention.

A second embodiment of the presnt invention will be described with reference to FIG. 4. In the second embodiment, the same function and effect as in the first embodiment can be obtained. In this embodiment, the rich air-fuel mixture injection control valve 24 is configured to be rotated at the same rotational speed as that of the crank shaft 8 in a direction (clockwise in FIG. 1) opposed to the rotational direction of the crank shaft 8. Accordingly, the portion serving as the guide for allowing sprayed fuel injected from the rich air-fuel mixture injection control valve 24 to be directed toward the combustion chamber 13 is the lower wall surface 21*al* of the communicating passage portion 21*a*. This portion is different from that in the first embodiment; however, the other configurations of the second embodiment are the same as in the first embodiment. Therefore, a detailed description with respect thereto is omitted.

A third embodiment of the present invention will be described with reference to FIGS. 5 to 7. First, the background of this embodiment will be described. With respect to the guide wall of the communicating passage portion 21*a* for allowing sprayed fuel injected from the rich air-fuel mixture injection control valve 24 to be directed toward the combustion chamber 13, the longer the guide wall, the higher the control effect thereof. However, the longer guide wall obstructs the compactness of the internal combustion engine and increases the time required for carrying the air-fuel mixture. This causes a difference in time between the valve opening timing of the rich air-fuel mixture injection control valve 24 and the injecting tiring of fuel into the cylinder, making it difficult to make the valve opening timing in a wide rotational range suitable. Furthermore, the amount of air required for carrying the air-fuel mixture is excessively increased in proportion to an increment of the length of the communicating passage portion 21*a*.

Accordingly, it is desired to make the communicating passage portion 21*a* as short as possible. However, when the communicating passage portion 21*a* is excessively short, the direction of the sprayed fuel toward the combustion chamber 13 is degraded, leading to interference with a wall surface of the cylinder 5.

Figure 8:
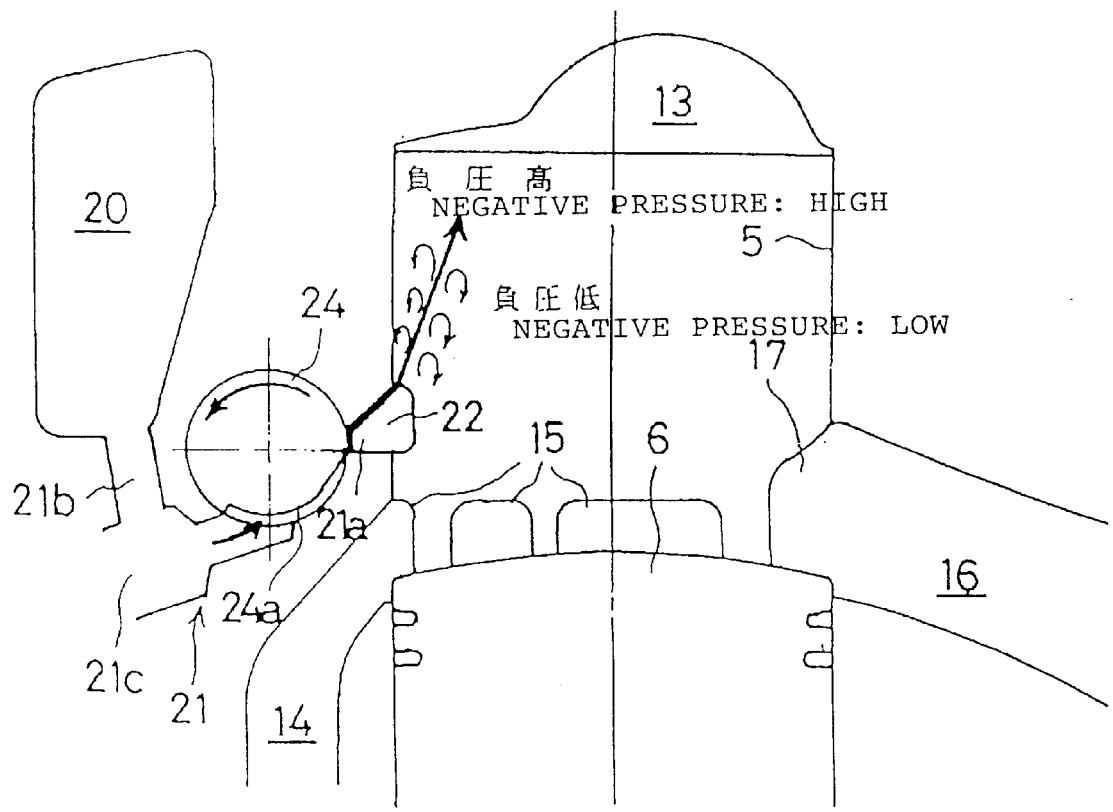
FIG. 8 is a view illustrating the background of the embodiment shown in FIG. 5.

The reason for this will be described with reference to FIG. 8. The airfuel mixture injected from the rich airfuel mixture supply opening 22 advances forward while entrapping air in the surroundings and is diffused and sprayed. Accordingly, the pressure of a portion around the sprayed fuel becomes negative and a counterclockwise swirl and a clockwise swirl occur on the upper and lower sides of the sprayed fuel in FIG. 8, respectively. The stream of sprayed fuel directly after injection, which is thin and injected at a high speed, strongly entraps air around the sprayed fuel and thereby the negative pressure around the sprayed fuel becomes higher. when the sprayed fuel is injected obliquely upward, the space above the fuel injection port is smaller than the space below the fuel injection port. Therefore, the negative pressure in the upper space increases. As a result, an upward deflecting force is exerted on the sprayed fuel.

In this embodiment, when the communicating passage portion 21*a* is short, in order to solve the problem of high negative pressure in the space above the fuel injection port, a guide for controlling the direction of sprayed fuel is provided. The guide is formed by a recessed portion 29 in a portion of the cylinder side wall at a position higher than the air-fuel mixture supply opening 22 such that a recessed surface 29*a* of the recessed portion 29 is continuous with an edge, on the rich air-fuel mixture supply opening 22 side, of the upper wall surface 21*au* of the communicating passage portion 21*a*.

Figure 5:
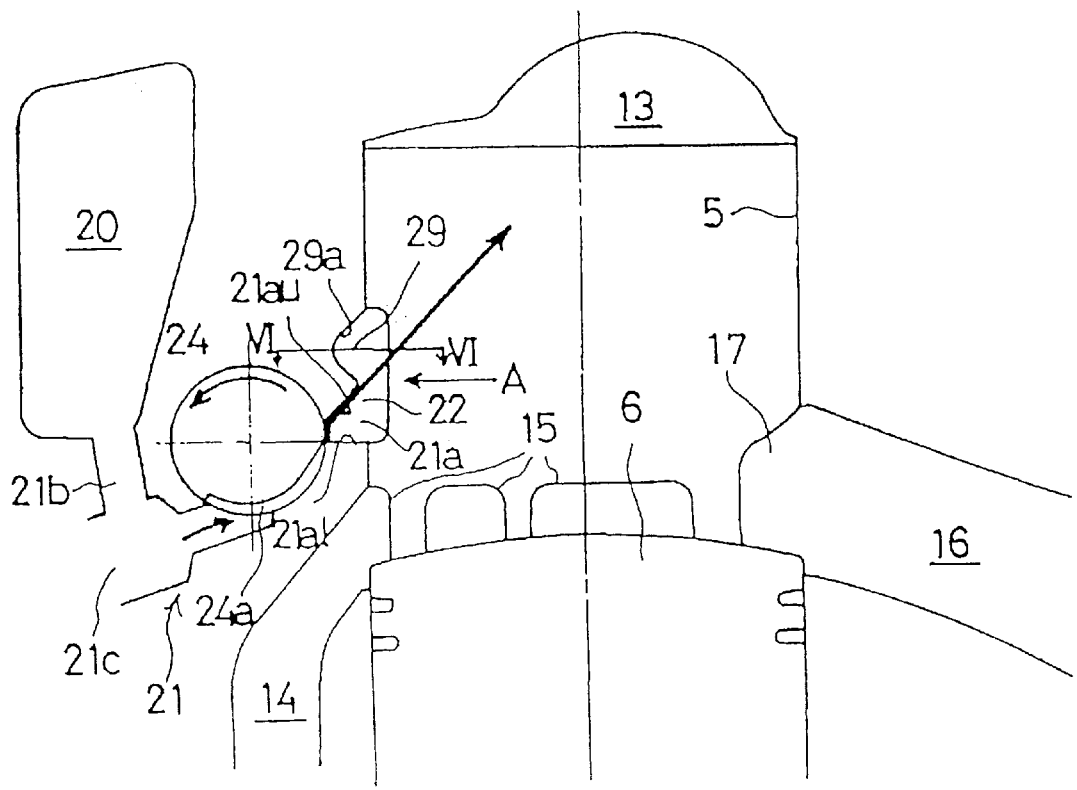
FIG. 5 is a schematic enlarged view, similar to FIG. 2, showing an essential portion of a two-cycle internal combustion engine according to a third embodiment of the present invention.

The recessed portion 29 and the upper wall surface 21*au* of the communicating passage portion 21*a* have the shape of a ski jump in cross-section taken along a plane passing through the center line of the cylinder bore 5 as seen in the injecting direction of the air-fuel mixture (see FIG. 5).

Accordingly, the recessed surface 29*a* of the recessed portion 29 has two surface portions which are substantially perpendicular to each other such that one surface portion is substantially perpendicular to the upper wall surface 21*au* and the other surface portion is substantially parallel to the upper wall surface 21*au*. In addition, a corner portion of the two perpendicular surface portions is rounded.

The corner portion where the edge of the upper wall surface 21*au* on the rich air-fuel mixture supply opening 22 side is connected to the recessed surface 29*a* of the recessed portion 29 is liable to be cutoff and worn by the reciprocating motion of the piston. In order to avoid the wear, the corner portion is formed below the wall surface of the cylinder bore 5 and is rounded. With this configuration, it is possible to prevent the wall surface of the cylinder bore 5 from being damaged by abrasiveness of the corner portion.

Figure 6:
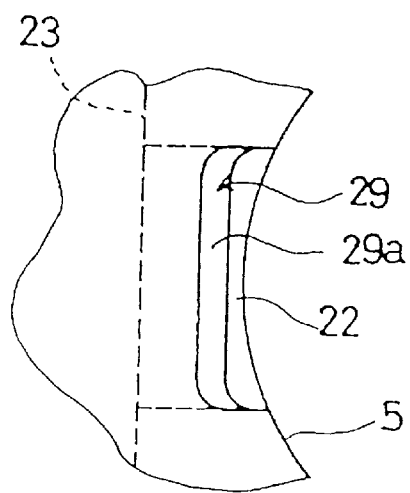
FIG. 6 is a transverse sectional side view taken on line VI—VI of FIG. 5, showing a recessed portion and a rich air-fuel mixture supply opening portion.
Figure 7:
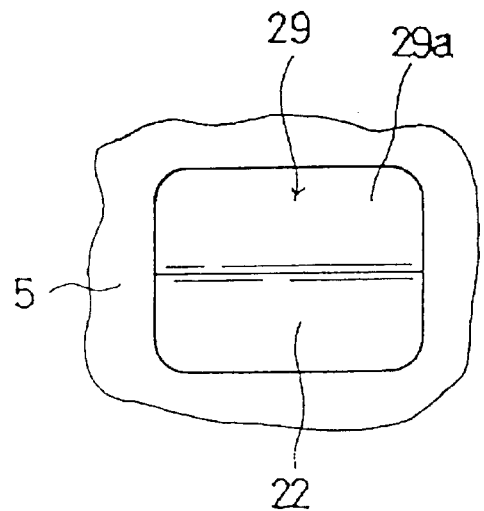
FIG. 7 is a front view, viewed from the direction A of FIG. 5, showing the recessed portion and the rich air-fuel mixture supply opening portion.

FIGS. 6 and 7 show a transverse sectional view taken in the peripheral direction and a front view, showing the recessed portion 29 and the rich air-fuel mixture supply opening 22 portion, respectively. In the development, the rich air-fuel mixture supply opening 22 is formed into an approximately rectangular shape elongated in the peripheral direction and the recessed portion 29 is also formed, in a front view, into an approximately rectangular shape elongated in the peripheral direction and having the same peripheral length as that of the rich airfuel mixture supply opening 22. The remaining configurations of this embodiment are the same as the first embodiment 1, so a detailed explanation with respect thereto is omitted.

In the embodiment having the above configuration, the space above the fuel injection port is extended to reduce the negative pressure caused by the fuel injection. As a result, even when the communicating passage portion 21*a* is relatively short, the negative pressure in the space above the fuel injection port is close to the negative pressure in the space below the fuel injection port. Therefore, it is possible to keep the direction of the air-fuel mixture injected and sprayed uniform and prevent interference of the sprayed fuel with the cylinder wall, combustion chamber wall, piston 6 and the like.

Furthermore, since the recessed portion 29 and the upper wall surface 21*au* of the communicating passage portion 21*a* are shaped in cross-section like a ski jump, a sufficient space is ensured in the space above the fuel injection port. As a result, the negative pressure caused by the fuel injection is sufficiently reduced. Furthermore, even when the communicating passage portion 21a is relatively short, the negative pressure in the space above the fuel injection port is close to the negative pressure in the space below the fuel injection port. Therefore, it is possible to keep the direction of the air-fuel mixture injected and sprayed uniform and prevent interference of the sprayed fuel with the cylinder wall, combustion chamber wall, piston and the like.

In each of the three embodiments, air for forming an air-fuel mixture is taken from the highly-compressed gas intake port 27 facing the combustion chamber 13; however, it may be taken from the crank chamber 9. Even in this case, the same effect can be obtained as that in each of the three embodiments by applying the present invention to the rich air-fuel mixture supply opening (fuel supply opening) 22.

The invention being thus described it will be obvious that the same may be varied in many ways. Such variationas are not to be regarded as a departure from the spirit and scope of the invention, and all such modifications as would be obvious to one skilled in the art are intended to be included within the scopeof the following claims.

We claim:
1. A two-cycle internal combustion engine comprising:
   a combustion chamber;
   a chamber portion adjacent to said combustion chamber;
   a first communicating passage extending between said combustion chamber and said chamber portion, said first communicating passage for supplying a highly compressed gas from said combustion chamber to said chamber portion;
   a second communicating passage extending between said combustion chamber and said chamber portion, said second communicating passage for supplying a fuel or an air-fuel mixture to said combustion chamber from said chamber portion;
   a control valve disposed in said communicating passage for controlling opening and closing of said communicating passage;
   a fuel or air-fuel mixture supply opening facing said combustion chamber; and
   wherein a portion of said communicating passage between said control valve and said fuel or air-fuel mixture supply opening is configured to inject sprayed fuel from said control valve to a part or all of a wall surface of said communicating passage, the wall surface being directed toward the combustion chamber to form a guide for controlling the direction of the sprayed fuel.

2. A two-cycle internal combustion engine comprising:
   a combustion chamber;
   a chamber portion adjacent to said combustion chamber;
   a communicating passage extending between said combustion chamber and said chamber portion;
   a control valve disposed in said communicating passage for controlling opening and closing of said communicating passage;
   a fuel or air-fuel mixture supply opening facing said combustion chamber;
   a recessed portion formed above said fuel or air-fuel mixture supply opening having a surface continuous with an edge of said wall surface of said communicating passage for decreasing a negative pressure above said fuel or air-fuel mixture supply opening in said combustion chamber; and wherein a portion of said communicating passage between said control valve and said fuel or air-fuel mixture supply opening is configured to inject sprayed fuel from said control valve to a part or all of a wall surface of said communicating passage, the wall surface being directed toward the combustion chamber to form a guide for controlling the direction of the sprayed fuel.

3. The two-cycle internal combustion engine according to claim 2, wherein said recessed portion and the wall surface of said communicating passage form a ski jump shape in cross-section.

4. The two-cycle internal combustion engine according to claim 2, wherein said recessed portion includes a first wall generally perpendicular to and continuous with said wall surface of said communicating passage and a second wall surface generally parallel to said wall surface of said communicating passage.

5. The two-cycle internal combustion engine according to claim 2, wherein said portion of said communicating passage is configured to inject the sprayed fuel onto a lower wall surface of said communicating passage.

6. The two-cycle internal combustion engine according to claim 2, wherein said portion of said communicating passage is configured to inject the sprayed fuel onto an upper wall surface of said communicating passage.

7. The two-cycle internal combustion engine according to claim 2, wherein said control valve rotates in a direction from an upper wall surface to a lower wall surface of said communicating passage to direct the sprayed fuel onto the lower wall surface.

8. The two-cycle internal combustion engine according to claim 2, wherein said control valve rotates in a direction from a lower wall surface to an upper wall surface of said communicating passage to direct the sprayed fuel onto the upper wall surface.

9. A two-cycle internal combustion engine comprising:
   a combustion chamber;
   a communicating passage in communication with said combustion chamber;
   a recessed portion formed adjacent to said wall surface of said communicating passage, said recessed portion having a surface continuous with an edge of said wall surface of said communicating passage for decreasing a negative pressure above said fuel or air-fuel mixture supply opening in said combustion chamber; and
   a control valve disposed in said communicating passage for controlling opening and closing of said communicating passage, said control valve being mounted to rotate in a direction to inject sprayed fuel onto a wall surface of said communicating passage, the wall surface being directed toward the combustion chamber to form a guide for controlling the direction of the sprayed fuel.

10. The two-cycle internal combustion engine according to claim 9, wherein said recessed portion and the wall surface of said communicating passage form a ski jump shape in cross-section.

11. The two-cycle internal combustion engine according to claim 9 wherein said recessed portion includes a first wall generally perpendicular to and continuous with said wall surface of said communicating passage and a second wall surface generally parallel to said wall surface of said communicating passage.

12. The two-cycle internal combustion engine according to claim 9, wherein said portion of said communicating passage is configured to inject the sprayed fuel onto a lower wall surface of said communicating passage.

13. The two-cycle internal combustion engine according to claim 9, wherein said portion of said communicating passage is configured to inject the sprayed fuel onto an upper wall surface of said communicating passage.

14. The two-cycle internal combustion engine according to claim 9, wherein said control valve rotates in a direction from an upper wall surface to a lower wall surface of said communicating passage to direct the sprayed fuel onto the lower wall surface.

15. The two-cycle internal combustion engine according to claim 9, wherein said control valve rotates in a direction from a lower wall surface to an upper wall surface of said communicating passage to direct the sprayed fuel onto the upper wall surface.

16. A method of injecting fuel into a combustion chamber of a two-cycle internal combustion engine comprising the steps of:

rotating a control valve located in a communicating passage in communication with the combustion chamber;

injecting fuel or an air-fuel mixture from said control valve onto a part or all of a wall surface of said communicating passage;

forming a recessed portion adjacent to the wall surface of the communicating passage to decrease the negative pressure in an upper portion of said combustion chamber to control the direction of the fuel or air-fuel mixture entering the combustion chamber; and guiding the fuel or air-fuel mixture with the wall surface to control the direction of the fuel or air-fuel mixture entering the combustion chamber.

17. The method according to claim 16, further comprising the step of forming the cross-section of the recessed portion and the wall surface of the connecting passage into the shape of a ski jump.

18. The method according to claim 16, further comprising the step of forming the recessed portion with a first wall generally perpendicular to and continuous with said wall surface of said communicating passage and a second wall surface generally parallel to said wall surface of said communicating passage.

* * * * *